May 10, 1938.  O. E. TRAUTMANN  2,117,231
FOCUSING CAMERA
Filed March 17, 1937
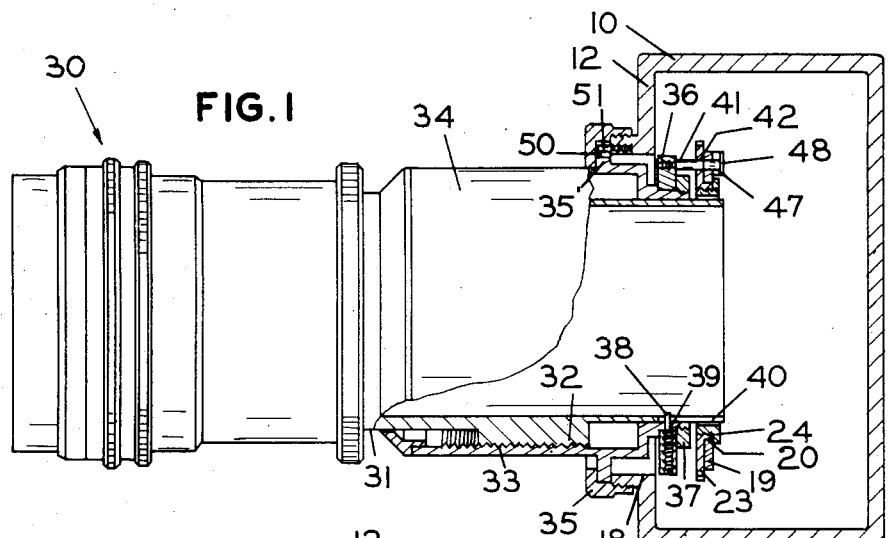
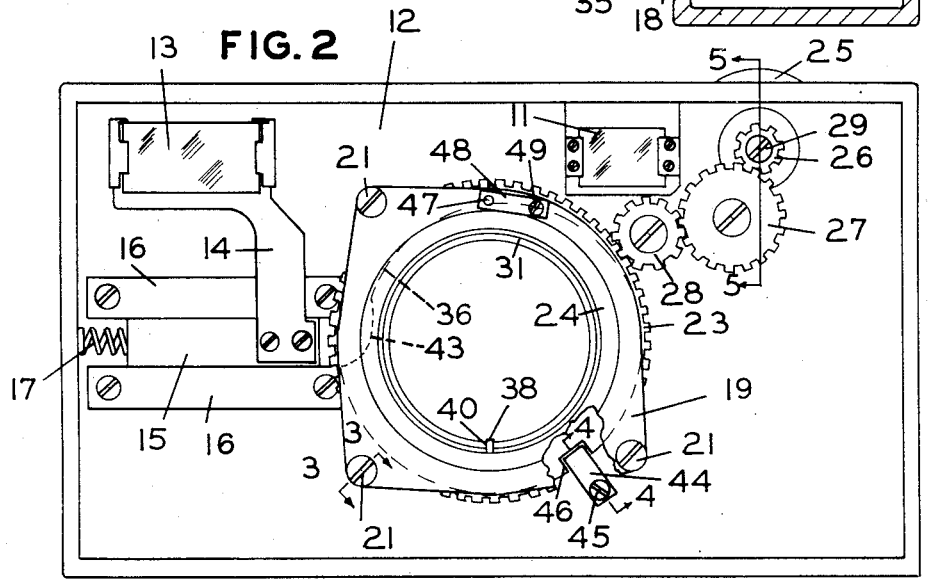
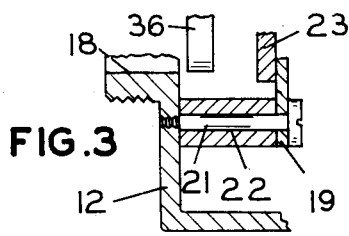
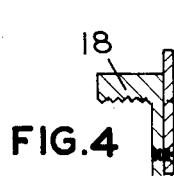
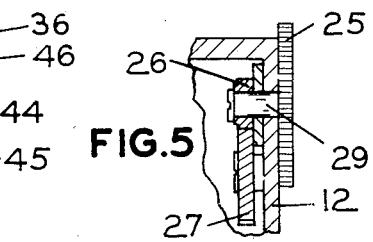
OTTO E. TRAUTMANN
INVENTOR.
BY
ATTORNEYS Patented May 10, 1938

2,117,231

UNITED STATES PATENT OFFICE 2,117,231

FOCUSING CAMERA

Otto E. Trautmann, Irondequoit, N. Y., assignor to Bausch & Lomb Optical Company, Rochester, N. Y., a corporation of New York Application March 17, 1937, Serial No. 131,415

4 Claims. (Cl. 95—45)

The present invention relates to focusing cameras and more particularly to focusing cameras of the rangefinder type.

One of the objects of the present invention is to provide a new and improved camera of the focusing rangefinder type. Another object is to provide a focusing rangefinder type of camera having an objective focusing knob permanently and rotatably mounted on the camera body. A further object is to provide a camera of the focusing rangefinder type in which the objective focusing mechanism and the rangefinder mechanism are carried by the camera housing and in which the objective mount carries a rangefinder actuating cam and connections for cooperating with the objective focusing mechanism. These and other objects and advantages reside in certain novel features of construction, arrangement and combination of parts as will hereinafter be more fully set forth and pointed out in the appended claims.

Referring to the drawing:

Fig. 1 is a side elevation of my improved camera with parts broken away to show internal structure.

Fig. 2 is a rear view of the focusing mechanism.

Fig. 3 is a section taken on line 3—3 of Fig. 2.

Fig. 4 is a section taken on line 4—4 of Fig. 2.

Fig. 5 is a section taken on line 5—5 of Fig. 2.

The embodiment illustrated in the drawing is an adaptation of my invention to a camera such as that described and claimed in U. S. application Serial No. 65,652 filed February 25, 1936 by Alan A. Cook and Otto E. Trautmann, and entitled Focusing camera. It is to be understood, however, that this adaptation is only for the purpose of illustration and that my invention may be used with various other types of camera and rangefinder.

In the embodiment shown, 10 designates, generally, a camera housing within which is mounted the shutter mechanism and film or plate holding mechanism, not shown. The lens 11 is fixedly secured in an aperture in the front wall 12 of the housing 10 and the lens 13 is mounted on a support 14 which is secured to a slide 15 movable in guides 16 secured to the front wall 12 of the housing 10. A spring 17 urges the slide 15 in one direction. This structure is substantially identical with that described in the Cook and Trautmann application and therefore no further explanation appears necessary.

The front wall 12 is provided with an objective receiving opening 18 and a plate 19 having a central opening 20 is secured on the front wall 12 in spaced relation thereto so that the opening 20 is in alignment with the opening 18. As shown in Fig. 3, the plate 19 is secured to the wall 12 by screws or bolts 21 and spacing collars 22 surrounding the screws or bolts 21 hold the plate 19 at the desired distance from the wall 12.

An annular gear 23 is rotatably secured on the plate 19 by a ring 24 and is actuated by means of an adjustment wheel 25 through a train of gears 26, 27 and 28. As shown in Figs. 2 and 5, the adjustment wheel 25 is mounted on a shaft 29 so that it extends above the top of the housing 10 in a convenient position for actuation by the operator. The shaft 29 is journalled in the front wall 12 of the housing 10 and carries the gear 26.

The objective indicated generally at 30 is carried by a sleeve 31 having a threaded portion 32 engaging the threaded portion 33 of a second sleeve 34. The sleeve 34 is preferably secured on the front wall 12 by means of a locking ring 35 which engages lugs 35' on the sleeve 34 in the manner disclosed in U. S. Patent 1,971,934 issued August 28, 1934 to O. E. Trautmann. Any other suitable form of attaching means could be used.

An annular cam 36 is rotatably mounted on the rear end of the sleeve 34 within the housing 10 and is held against longitudinal movement by a lock ring 37 threaded onto the sleeve 34. A pin 38 extends radially through the cam 36 and through radial slot 39 in the sleeve 34 and projects into a longitudinal slot 40 in the sleeve 31. A second pin 41 is secured in the cam 36 and extends rearwardly into an aperture 42 in the annular gear 23. The lens is thus focused by rotation of the adjustment wheel 25 which drives the annular gear 23 through gears 26, 27 and 28. The cam 36 rotates with the gear 23 due to the pin 41 and the pin 38 causes the lens sleeve 31 to rotate in the sleeve 34. The interaction of the threaded portions 32 and 33 causes the objective 30 to move axially for focusing. At the same time, the cam 36 moves the lens 13 of the rangefinder system in synchronism with the focusing movement of the objective 30.

In changing objectives, it is essential that the objective be inserted so that the low point 43 of the cam 36 be in registration with the slide 15. For this reason a lug 44 is secured to the front wall 12 of the housing 10 by means of a screw 45 so that it extends partially into the opening 18. The cam 36 is provided with a slot 46 permitting the cam 36 to pass the lug 44 when the cam 36 is in proper position. Any focusing movement of the objective 30 is accompanied by rotation of the cam 36 which causes the slot 46 to move out of registration with the lug 44 and thus prevents removal of the objective 30.

The annular gear 23 is locked in proper position to receive the pin 41 in the aperture 42 by means of a pin 47 attached to a leaf spring 48 which is secured by a screw 49 to the plate 19. The spring 48 urges the pin 47 toward the annular gear 23 and, when the objective mount is in suitable position for withdrawal, the pin 47 is in alignment with the aperture 42 and is held out of the aperture 42 by the pin 41. This position is illustrated in Fig. 1. Upon removal of the objective 30, the pin 47 enters the aperture 42 and locks the gear 23 against rotation.

In the preferred embodiment of my invention, one of the attaching lugs 35' is formed with a slot 50 for snugly receiving a pin 51 fixed on the front wall 12 of the housing 10. The objective mount can thus be secured on the wall 12 in only one position, the position in which the slot 50 engages the pin 51. The pin 51 and slot 50, the lug 44 and slot 46, and the pin 41 and aperture 42 are so related that the objective 30 can be removed only when in some predetermined focus position such as the infinity focus position.

From the foregoing, it will be apparent that I am able to attain the objects of my invention and provide an improved camera of the focusing rangefinder type in which the focusing knob is in a readily accessible position and which is simple and efficient in operation. Various modifications can, of course, be made without departing from the spirit of my invention or the scope of the appended claims.

I claim:

1. In a focusing camera, a housing having an objective receiving opening therein, a support fixed within said housing adjacent said opening, an annular gear rotatably mounted on said support in alignment with said opening, means extending outside of said housing for actuating said annular gear, a rangefinder mechanism carried by said housing, said mechanism having a movable actuating part adjacent the opening in said housing, an objective mount, said objective mount having a part which is rotatably mounted for focusing, a cam rotatably carried by said mount and interconnected with said rotatable part for rotation therewith, means on said cam for operating the movable actuating part of said rangefinder mechanism, and releasable means for operatively connecting said cam and said annular gear.

2. In a focusing camera, a housing having an opening therein, a first sleeve secured to said housing at said opening, a second sleeve rotatably mounted within said first sleeve, means interconnecting said sleeves whereby rotation of said second sleeve causes longitudinal movement thereof for focusing, a cam rotatably mounted on said first sleeve, means interconnecting said cam to said second sleeve for rotation therewith, a rangefinder mechanism carried by said housing, said mechanism having an operating part engaging said cam whereby said rangefinder moves in synchronism with said focusing movement, an annular gear rotatably mounted in said housing in alignment with said opening, means interconnecting said annular gear and said cam, and means for rotating said annular gear.

3. In a focusing camera, a housing having an opening therein, a first sleeve secured to said housing at said opening, a second sleeve rotatably mounted within said first sleeve, means interconnecting said sleeves whereby rotation of said second sleeve causes longitudinal movement thereof for focusing, a cam rotatably mounted on said first sleeve, means interconnecting said cam to said second sleeve for rotation therewith, a rangefinder mechanism carried by said housing, said mechanism having an operating part engaging said cam whereby said rangefinder moves in synchronism with said focusing movement, an annular gear rotatably mounted in said housing in alignment with said opening, means interconnecting said annular gear and said cam, and means for rotating said annular gear, said last-named means comprising an adjustment wheel rotatably carried by said housing and extending partially above the top thereof, and a driving connection between said wheel and said annular gear.

4. In a focusing camera, a housing having an objective mount receiving opening, a sleeve adapted to be secured on said housing at said opening, means for positioning said sleeve on said housing, a second sleeve rotatably mounted in the first sleeve and extending into said housing, cam means interconnecting said sleeves whereby rotation of the second sleeve causes axial movement thereof, an objective carried by said second sleeve, a cam rotatably mounted on the first-named sleeve within the housing, means interconnecting said cam and said second sleeve so that they rotate together, an annular gear rotatably mounted in said housing coaxially with said cam, means for rigidly connecting said cam and said gear whereby rotation of said gear rotates said cam, means for rotating said gear, a rangefinder mechanism carried by said housing, said mechanism having a part movable for focusing, and means interconnecting said cam and said part whereby rotation of said cam separates said movable part.

OTTO E. TRAUTMANN.